United States Patent
Bacon

(10) Patent No.: US 8,527,142 B2
(45) Date of Patent: Sep. 3, 2013

(54) METHOD FOR REDUCING VARIATIONS IN DRIVE BELT TENSION

(75) Inventor: Donald R. G. Bacon, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 12/828,650

(22) Filed: Jul. 1, 2010

(65) Prior Publication Data
US 2011/0004373 A1 Jan. 6, 2011

(30) Foreign Application Priority Data
Jul. 4, 2009 (GB) .................... 0911679.9

(51) Int. Cl.
*G06F 7/00* (2006.01)
(52) U.S. Cl.
USPC .......................................................... 701/36
(58) Field of Classification Search
USPC .......................................................... 701/36
See application file for complete search history.

(56) References Cited

U.S. PATENT DOCUMENTS

| | | | |
|---|---|---|---|
| 2003/0015175 A1* | 1/2003 | Andersson et al. | 123/406.47 |
| 2003/0107351 A1* | 6/2003 | Taniguchi et al. | 322/36 |
| 2004/0067803 A1* | 4/2004 | Nakamura | 474/70 |
| 2004/0102892 A1* | 5/2004 | Aldrich et al. | 701/110 |
| 2004/0103881 A1* | 6/2004 | Chen et al. | 123/357 |
| 2005/0029991 A1* | 2/2005 | Albertson | 322/29 |
| 2011/0000421 A1* | 1/2011 | Zhang et al. | 116/28 R |

OTHER PUBLICATIONS

GB Search Report dated Nov. 2, 2009 for GB0911679, pp. 1.

* cited by examiner

*Primary Examiner* — James Trammell
*Assistant Examiner* — Michael D Lang
(74) *Attorney, Agent, or Firm* — Frank A. MacKenzie; Brooks Kushman P.C.

(57) ABSTRACT

A method for reducing variations in tension in a drive belt 7 of an accessory belt drive system is disclosed in which an electrical load imposed upon the drive belt 7 by an electrical generator 8 is modulated based upon fluctuations in the speed at which the drive belt 7 is driven. By reducing the electrical load when the drive belt 7 is being accelerated and increasing the electrical load when the drive belt is decelerating the difference between the maximum tension and the minimum tension in the drive belt 7 is reduced.

17 Claims, 5 Drawing Sheets

METHOD FOR REDUCING VARIATIONS IN DRIVE BELT TENSION

CROSS-REFERENCE TO RELATED APPLICATIONS

This application claims foreign priority benefits under 35 U.S.C. §119 (a)-(d) to GB 0911679.9 filed Jul. 4, 2009, which is hereby incorporated by reference in its entirety.

BACKGROUND

1. Technical Field

This disclosure relates to a belt accessory drive for a motor vehicle and in particular to a method of reducing variations in drive belt tension produced by fluctuations in engine speed.

2. Background Art

It is well known to use an accessory drive system on a motor vehicle that requires a belt to transmit drive from a driving pulley attached to the output from an engine to a driven pulley used to drive the accessory. One example of such an accessory drive system is a crank damper of an internal combustion engine driving an electrical generator such as an alternator.

In a normal alternator drive system the electrical load on the belt from the alternator is relatively constant and the belt drive system accelerates and then decelerates the alternator cyclically in phase with engine speed fluctuations due to the combustion process occurring within the engine. This acceleration and deceleration of the belt drive system results in variations in the tension in the belt which if not allowed for in the design of the belt drive system can result in extremes of tension. Excessively high tension can cause premature belt aging leading to early failure or bearing failure either in the engine, the alternator or other accessories driven by the same belt. Excessively low tension can result in belt slippage with resultant high belt wear and noise.

SUMMARY

According to an embodiment of the disclosure there is provided a method of reducing tension variations in a drive belt for an accessory belt drive of a motor vehicle having a drive pulley driven by an engine of the motor vehicle and a driven pulley driving an electrical generator, the driven pulley being drivingly connected to the drive pulley by the drive belt wherein the method includes varying the electrical load applied to the drive belt by the electrical generator in response to variations in engine output speed.

When the output speed from the engine is increasing, the electrical load generated by the electrical generator may be reduced.

When the output speed from the engine is decreasing, the electrical load generated by the electrical generator may be increased.

The electrical load applied by the electrical generator may be varied in an anti-phase manner relative to acceleration and deceleration of the engine.

The engine acceleration may fluctuate between a maximum acceleration and a maximum deceleration and the electrical load may be varied so that the maximum electrical load is generated substantially 180 degrees out of phase with the maximum acceleration and the minimum electrical load is generated substantially 180 degrees out of phase with maximum deceleration.

The fluctuations in engine output speed may be used to determine instantaneous values of engine acceleration.

The instantaneous acceleration may be used to determine a frequency of engine speed variation.

The engine speed may be determined by measuring the instantaneous rotational speed of the drive pulley using a sensor.

The engine speed may be determined in an indirect manner using at least one look up table.

The look up table may use engine mapping in combination with current engine operating conditions.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations.

Figure 1:
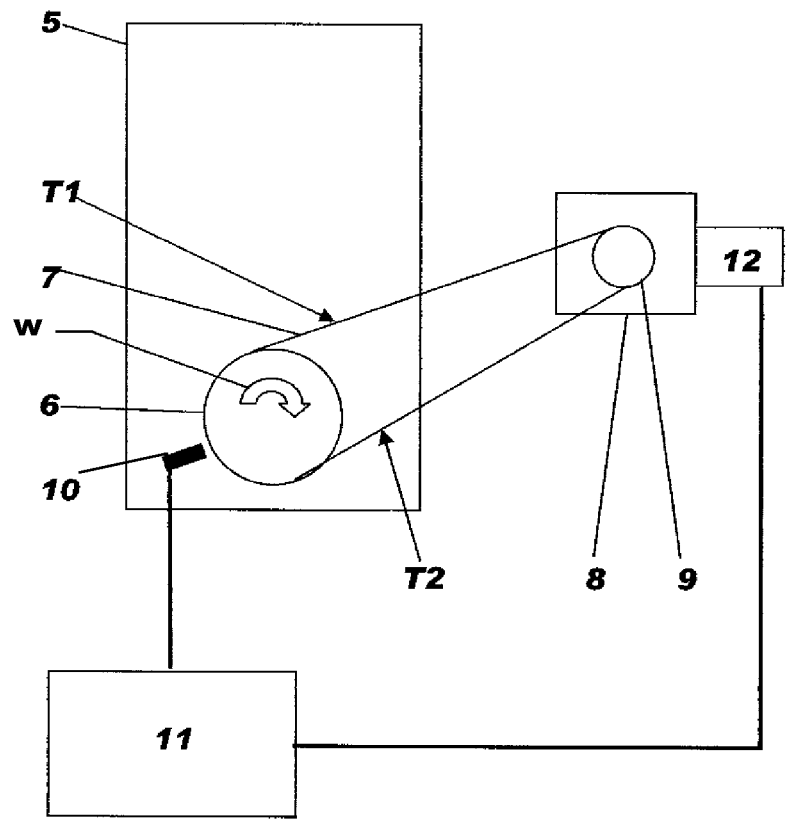
FIG. 1 is a schematic diagram of an engine and accessory belt drive system for a motor vehicle.
Figure 2:
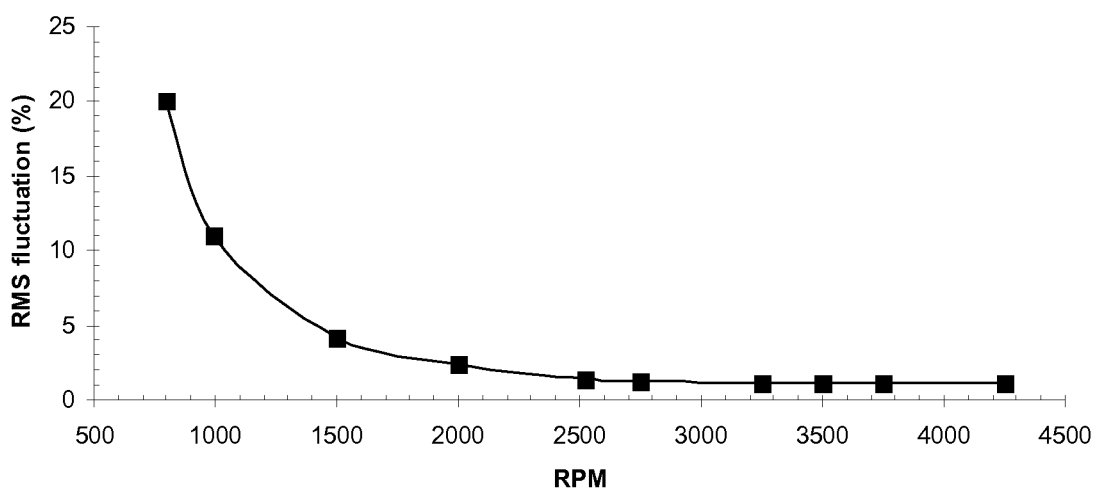
FIG. 2 is a chart showing the variation of percentage speed fluctuation with engine speed for a typical engine.

With reference to FIGS. 1 and 2 there is shown an internal combustion engine 5 having a drive wheel in the form of a poly V belt drive pulley 6 connected to the end of a crankshaft (not shown) of the engine 5 to provide drive to an accessory in the form of an electrical generator 8. The electrical generator 8, which in this case is an alternator, has a rotor (not shown) driven by a driven pulley wheel 9 which is driveably connected to the drive wheel 6 by a poly V belt 7. The drive pulley 6 is rotated in the direction 'w' by the engine 5 and generates tensions T1 and T2 in the poly V belt 7.

The instantaneous rotational speed of the engine 5 is determined by an optical sensor 10 which determines not only speed but also rotational position. The sensor 10 provides an instantaneous speed sensor to an electronic processor 11 which may be part of a separate unit as shown in FIG. 1 or can be formed as part of an alternator control unit 12 for the alternator 8. Sensor 10 may be other suitable type of sensor other than an optical sensor.

When the engine 5 is operating the drive pulley 6 rotates in the direction 'w' as shown but as will be appreciated by those skilled in the art the speed of rotation is not uniform but fluctuates due to the phasing of the combustion strokes of the engine 5. In idealized terms the speed of the engine 5 can be considered as a predetermined rotational speed plus or minus a small amount and varies cyclically in a manner that can be approximated as a sine wave. FIG. 2 shows the variation of percentage rotational speed that the speed of the engine 5 fluctuates by for a typical four cylinder engine. So for example at a mean rotational speed of 1000 RPM the RMS speed fluctuation is 11% or 110 RPM (Vmin 945 RPM to Vmax 1055 RPM). This fluctuation in engine speed will result in variations in the tensions T1 and T2 in the drive belt 7 as the engine has to accelerate and then decelerate the alternator 8.

The resistance to acceleration and deceleration imposed by the alternator 8 and hence the tensions T1 and T2 generated in the drive belt 7 includes three components, namely: the inertia which resists acceleration; the momentum which represents stored rotational energy, which resists deceleration; and the electrical load produced by the alternator 8 when generating electrical power, which resists acceleration and increases deceleration.

The inventor has realized that while the inertia and momentum are fixed by the design of the system, if the electrical load is modulated in a predetermined manner synchronized with crankshaft rotational irregularities, then it is possible to reduce the variation in tension in the drive belt with several advantageous effects as will be described hereinafter.

Figure 5A:
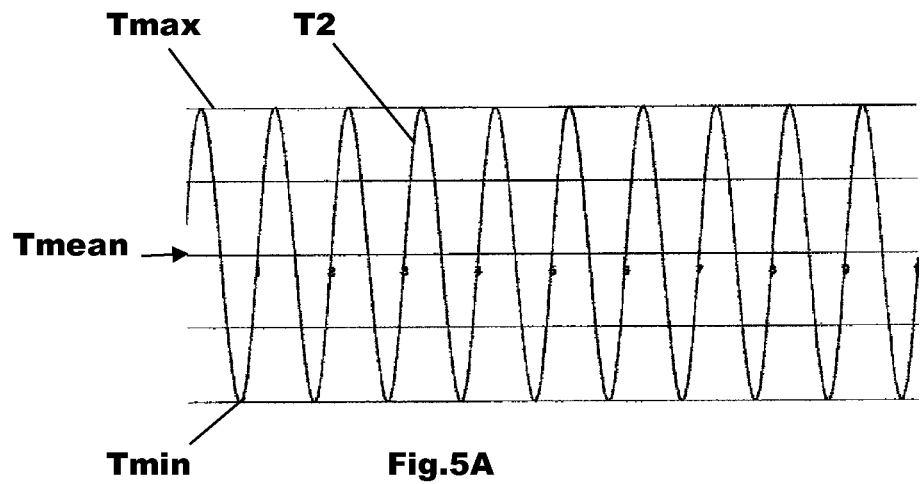
FIG. 5A is a graph showing the variation of drive belt tension against time for a conventional accessory drive belt system.

Referring now to FIG. 5A, there is shown an idealized representation of the variation of tension T2 for a conventional alternator 8 subjected to the fluctuations in engine speed described above. As part of the design process for a belt drive these variations in tension have to be taken into account such that the maximum value of tension in the drive belt does not exceed an upper limiting value, Tmax, and the minimum value of tension does not fall below a lower limiting value, Tmin. Tmax is the tension above which belt life or bearing life will be seriously compromised; and Tmin is the tension below which belt slip will likely occur. To ensure a belt drive system falls within these boundaries, a pre-load is applied to the drive belt corresponding to the value, Tmean. That is to say, Tmean is a tension between Tmax and Tmin that is determined with consideration to manufacturing tolerances and belt lifetime decay amongst other factors.

Figure 3:
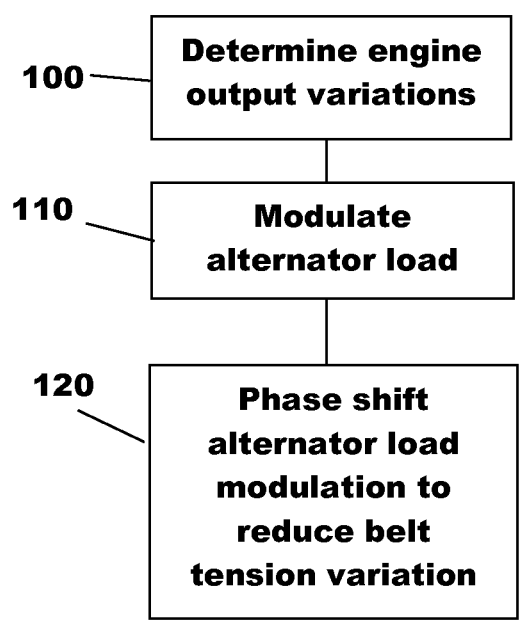
FIG. 3 is a block diagram showing one embodiment of a method according to the disclosure.
Figure 4:
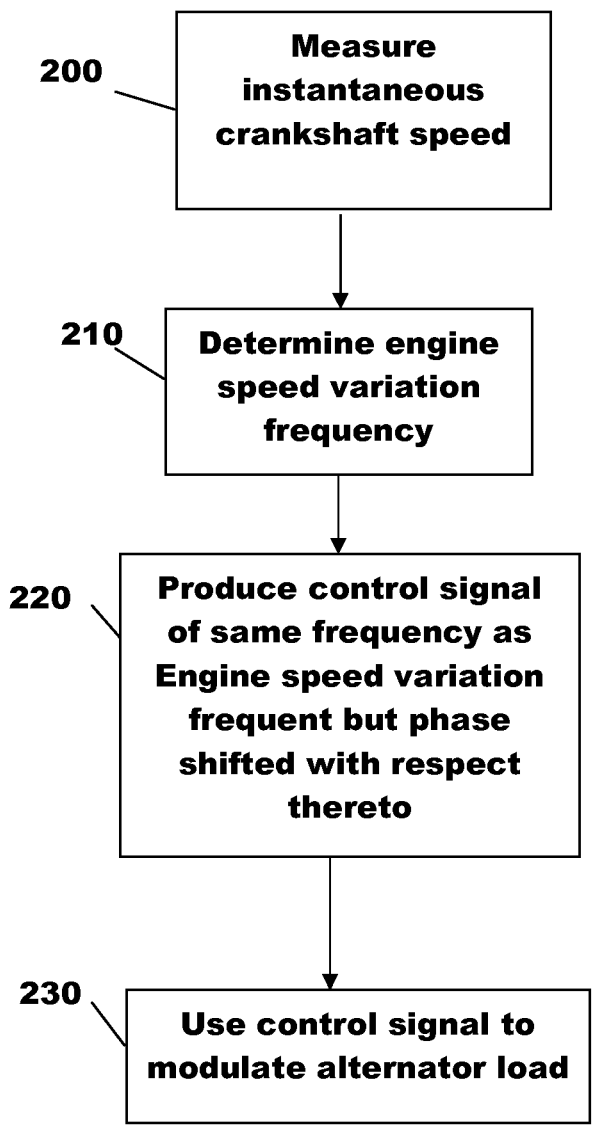
FIG. 4 is a block diagram showing one embodiment of a method according to the disclosure.

Referring to FIGS. 3 and 4, examples of a method employed in accordance with this disclosure to reduce variations in drive belt tension are shown.

With particular reference to FIG. 3, the first step 100 is to determine engine output variations which include instantaneous engine speed fluctuations, but may also include engine acceleration magnitudes and the frequency of these fluctuations. Then in step 110, the electrical load of the alternator 8 is modulated, that is to say, the electrical load is varied from a high level to meet the power demands of the vehicle to a lower level. This variation in electrical load can be affected by varying the excitation current supplied to the windings of the alternator, or in any other convenient manner, and is controlled by the alternator control unit 12 in response to a signal from the electronic processor 11. Then, in step 120 the modulation of the alternator 8 is controlled such that it is phase shifted relative to the fluctuations in engine acceleration so as to reduce variations in drive belt tension.

By using the electronic control unit 12 of the alternator 8, the varying input from the belt system is responded to in such a way that during an acceleration phase of the alternator 8, less electrical power is demanded from the alternator 8, thus permitting a smoother acceleration and reducing the tension, T2, in drive belt 7 while preventing an excessively low tension, T1. During the deceleration phase of the engine 5, significant electrical power is demanded thereby assisting with the deceleration of the alternator 8 thus reducing tension T1 but ensuring that the tension T2 does not fall excessively, thereby supporting the deceleration phase of the engine 5 and continuing the smoothing process.

Figure 6:
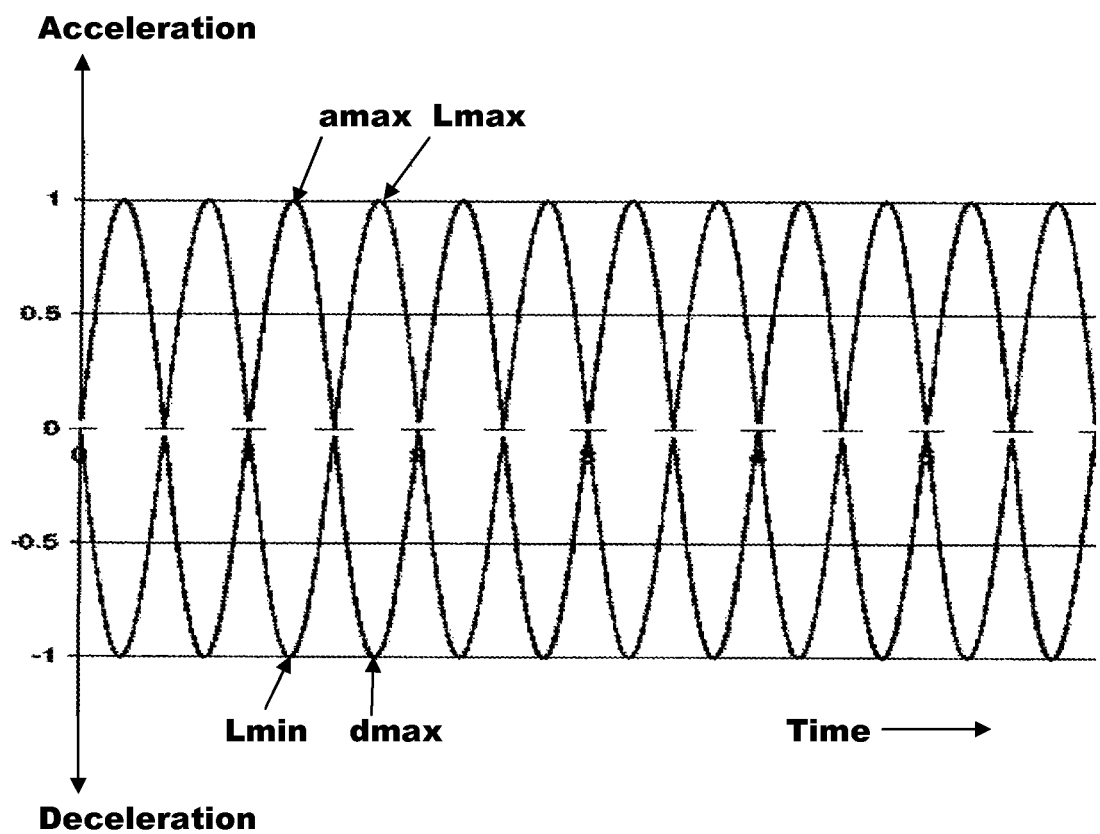
FIG. 6 is a graph showing electrical load superimposed on engine acceleration illustrating the anti-phasing of the electrical load relative to engine acceleration.

With reference to FIGS. 1, 4 and 6 there is shown one embodiment of a method for putting the disclosure into practice.

At step 200 the optical speed sensor measures directly the rotational speed of the drive pulley 6 and provides a signal indicative of this to the electronic processor 11.

Then, as indicated by step 210, the electronic processor 11 is programmed to take the raw instantaneous speed signal and produce values of instantaneous drive pulley acceleration and from this determine the instantaneous frequency of the fluctuations in drive pulley speed and the phase of these fluctuations relative to a fixed point such as top dead centre for cylinder one.

The electronic processor 11 is further operable to produce a control signal for use by the alternator control unit 12 so as to modulate or vary the electrical load imposed by the alternator 8. In this case, as indicated in step 220, the electronic processor 11 not only produces a control signal of the same frequency as the drive pulley fluctuations but also phase shifts this control signal to produce the require smoothing effect on drive belt tensions T1, T2. It will be appreciated that the phase shifting could alternatively be carried out by the alternator control unit 12.

In either case the phase-shifted control signal is used to control the electrical load of the alternator 8 by increasing and reducing the excitation current.

In an idealized case shown in FIG. 6, the phase shifting is such that the maximum electrical load, Lmax, is produced in an anti-phase relationship to the maximum acceleration, amax; that is to say, the maximum electrical load, Lmax, is supplied 180 degrees out of phase to the maximum acceleration, amax. Or looking at it from a different perspective, the maximum load, Lmax, is produced in phase with the maximum deceleration, dmax.

Similarly, the minimum electrical load, Lmin, is produced in an anti-phase relationship to the maximum deceleration, dmax, that is to say the minimum electrical load, Lmin, is supplied 180 degrees out of phase to the maximum deceleration, dmax, or looking at it from a different perspective the minimum load, Lmin, is produced in phase with the maximum acceleration, amax.

It will be appreciated that in practice the frequency of the fluctuations in engine speed are not regular but is constantly changing and so the electrical load variations often do not exactly match the variations in engine acceleration and deceleration. The system is however arranged to operate so as to achieve as close as possible the idealized anti-phase operation described above. The system may for example provide feedback of the difference between the phase when the maximum electrical load occurred compared to the actual measured peak acceleration for that cycle for use in fine tuning the phasing of the electrical load in a subsequent cycle.

Provided the phase of the maximum load, Lmax, is out of phase with the maximum acceleration, amax, within plus or minus 10 degrees of 180 degrees a large reduction in the variation in drive belt tension will be produced and so it is not critical to the performance of the disclosure that anti-phasing is maintained at exactly 180 degrees. In fact, even if the maximum load, Lmax, is out of phase with the maximum acceleration, amax, by only 150 degrees, a useful reduction in drive belt tension variation is produced.

It will be appreciated that even if the electrical load is instantly switchable and could be exactly anti-phased relative to drive pulley accelerations there would still be some variation in drive belt tension due to alternator mechanical loads such as inertia or momentum of the rotary components of the alternator 8 and driven pulley 9. That is to say, when the drive pulley 6 accelerates the inertia of the rotary components of the alternator 8 and the driven pulley 9 must be accelerated thereby increasing tension T2 and when the drive pulley 6 slows the momentum of the rotary components of the alternator 8 and the driven pulley 9 must be dissipated thereby increasing tension T1 and reducing tension T2.

However, particularly when the engine 5 is operating at relatively low speeds, the magnitude of the tension due to the electrical load is significant relative to the tension due to the mechanical loads and so the modulation of the alternator electrical load as described above has a considerable advantageous effect by reducing variations in drive belt tension.

Although the method described above uses direct measurement of the engine speed fluctuations it will be appreciated that the speed variations could be established in an indirect manner by for example using engine mapping in combination with look up tables for the current engine operating conditions. In one example the frequency of fluctuations may be established from ignition or fuel injection timings and the peak acceleration determined from a look up table produced by dynamometer test work.

Figure 5B:
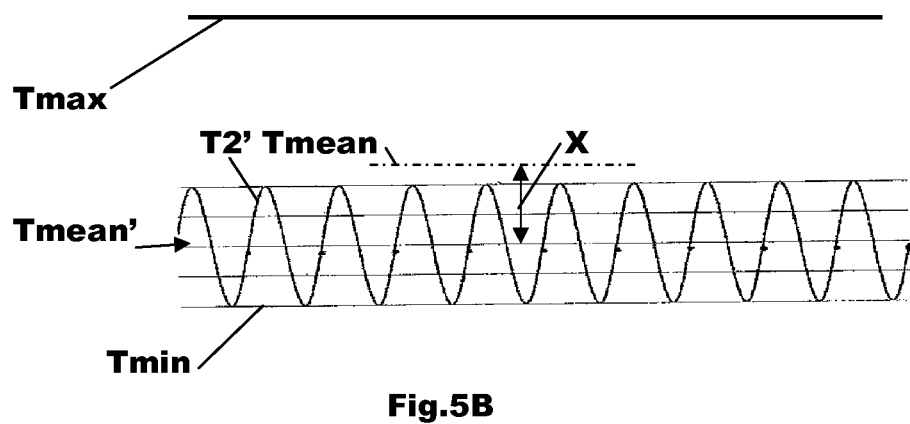
FIG. 5B is a graph showing the variation of drive belt tension against time for a case where the disclosure is used to improve engine fuel economy.
Figure 5C:
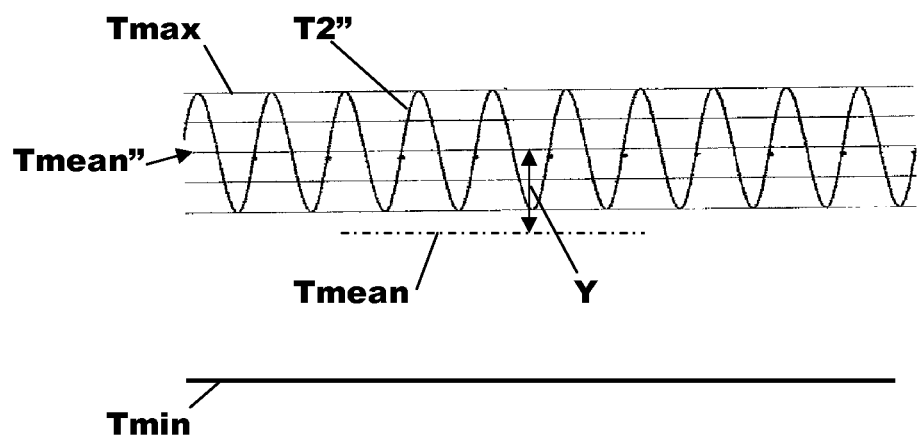
FIG. 5C is a graph showing the variation of belt tension against time for a case where the disclosure is used to provide a high level of drive without compromising belt life.

With reference to FIGS. 5A to 5C two particularly advantageous uses of the disclosure will be described.

FIG. 5A shows in an idealized form the variations in tension T2 for a conventional alternator arrangement in which the alternator 8 operates with a substantially constant electrical load. It will be appreciated that the amplitude of the curve T2 in FIG. 5A is a combination of the effect of the mechanical loads produced by the alternator 8 on the drive belt 7 and the effect of the electrical load produced by the alternator 8 on the drive belt 7. The electrical load is of course a torque that must be applied to the driven wheel 9 by the drive belt 7 to produce the demanded level of electrical power.

From FIG. 5A it can be seen that the tension T2 varies in a cyclical manner as the engine speed increases and slows. For any belt drive there is a maximum tension Tmax above which the tension becomes excessive and will result in rapid belt fatigue and potential damage to the supporting bearings of the engine 5 and the alternator 8. Similarly there is a minimum value of tension Tmin above which the belt tension must be maintained in order to prevent belt slip or tooth jumping in the case of a toothed belt both of which increase belt wear and produce unwanted noise.

To ensure that the belt tension falls within these two limits a pre-load is applied to the drive belt 7 which is indicated as Tmean on FIG. 5A. Note that in the case shown the variations in tension are such that the peak tension T2 is substantially equal to Tmax and the minimum tension T2 is substantially equal to Tmin but this need not be the case.

By using a tension variation reducing method according to this disclosure a designer of a drive belt system has increased scope to customize the drive belt design due to the smaller variations in drive belt tension that occur.

For example in FIG. 5B there is shown a drive belt system that has been customized to increase fuel economy and reduce $CO_2$ emissions.

Variations in tension in the drive belt 7 are indicated by the line T2', which has a mean tension of Tmean'. The reduction in amplitude between T2' and T2 shown in FIG. 5A is due to the fact that the effect of electrical loading has been virtually eliminated in FIG. 5B by the use of this disclosure.

To reduce parasitic loses it is desirable to minimize drive belt pre-tension while ensuring that the maximum and minimum tensions T2' fall between the upper and lower tension limits, Tmax and Tmin.

As can be seen in FIG. 5B, by positioning the minimum tension T2' adjacent the lower limit Tmin this has allowed the pre-tension Tmean' to be reduced by X Newtons compared to the prior art case Tmean shown in FIG. 5 while ensuring that the minimum and maximum tension limits Tmin and Tmax are not contravened.

Because the parasitic losses are reduced due to the lower pre-tension used with this embodiment then the fuel economy of the engine 5 used to drive the alternator 8 will be improved.

With reference to FIG. 5C there is shown a drive belt system that has been customized to provide a high level of belt tension at all times thereby allowing a high power alternator to be driven without compromising belt life or bearing life.

The variation in tension in the drive belt 7 is indicated by the line T2" this has a mean tension of Tmean". The reduction in amplitude between T2" and T2 shown in FIG. 5A is due to the fact that the effect of electrical loading has been virtually eliminated in FIG. 5C by the use embodiments of this disclosure.

To increase the drive capacity of the drive system it is desirable to maximize drive belt pre-tension, while ensuring that the maximum and minimum tensions T2" fall between the upper and lower tension limits, Tmax and Tmin.

As can be seen in FIG. 5C, by positioning the maximum tension T2" adjacent the upper limit Tmax this has allowed the pre-tension Tmean" to be increased by Y Newtons compared to the background art case Tmean shown in FIG. 5 while ensuring that the minimum and maximum tension limits, Tmin and Tmax, are not contravened.

Therefore when the tension T2" falls to its lowest value it is considerably higher than Tmin and the belt drive is able to continuously provide a high level of drive to the alternator 8. This may permit, in some circumstances, the use of a smaller drive belt or using fewer drive belts than would otherwise be the case thereby reducing system cost.

Therefore in summary a method has been disclosed for reducing variations in drive belt tension that is advantageous in its own right but also permits more flexibility in the design of a belt drive system to match required demand.

In an alternative embodiment of the disclosure, an adaptive belt tensioner may be used that can vary the static tension in the drive belt. The adaptive pulley is controlled by an electronic controller to increase the static tension as shown in FIG. 5C when a high power output is required by the electrical generator and reduce the static tension as shown in FIG. 5B when a low power output is required by the electrical generator. This change in static or mean operating tension is made possible by the use of the disclosure due to the smaller variations in belt tension produced when the disclosure is used.

Although the disclosure has been described with reference to the use of a poly V belt drive, it will be appreciated that it applicable to any accessory belt drive system where variations in tension cause a problem including and without limitation a single v belt drive system and a toothed belt drive system.

It will be appreciated that other accessories can be driven by the same belt used to drive the alternator and that the disclosure is not limited to an arrangement where a dedicated drive belt is used for an alternator.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A method for reducing tension variations in a drive belt of a motor vehicle having a drive pulley driven by an engine connected by a drive belt to a driven pulley driving an alternator, comprising:
   using a look up table having a variety of instantaneous engine acceleration and instantaneous fluctuations in the engine acceleration from phasing of combustion strokes of the engine; and
   varying electrical load applied to the drive belt by the alternator according to the engine acceleration determined indirectly using the fluctuations in the engine acceleration from the look-up table.

2. The method of claim 1 wherein, when acceleration from the engine is increasing, the electrical load generated by the alternator is reduced.

3. The method of claim 1 wherein, when acceleration from the engine is decreasing, the electrical load generated by the alternator is increased.

4. The method of claim 1 wherein electrical load applied by the electrical generator is varied in an anti-phase manner relative to acceleration and deceleration of the engine.

5. The method of claim 1 wherein the engine acceleration fluctuates between a maximum acceleration and a maximum deceleration and the electrical load is varied so that the maximum electrical load is generated substantially 180 degrees out of phase with respect to the maximum acceleration and the minimum electrical load is generated substantially 180 degrees out of phase with respect to maximum deceleration.

6. The method of claim 1, further comprising:
   determining instantaneous values of engine acceleration based on engine output speed.

7. The method of claim 6 wherein the instantaneous values of engine acceleration are used to determine a frequency of engine speed variation.

8. The method of claim 1 wherein the look up table uses engine mapping in combination with current engine operating conditions.

9. A belt accessory drive system for an internal combustion engine, comprising:
   an alternator having an alternator pulley;
   a belt mounted on the alternator pulley and an engine pulley coupled to the crankshaft; and
   an electronic processor electronically coupled to the alternator wherein the electronic processor commands a varying load applied to the drive belt by the alternator in response to variations in engine acceleration determined using a look up table that includes a variety of instantaneous engine acceleration and instantaneous fluctuations in engine acceleration from phasing of combustion strokes of the engine.

10. The belt accessory drive system of claim 9 wherein the electronic processor commands a reduction in load when engine acceleration is increasing.

11. The belt accessory drive system of claim 9 wherein the electronic processor commands an increase in load when engine acceleration is increasing.

12. The belt accessory drive system of claim 9 wherein the electronic processor commands the alternator to apply the load in an anti-phase manner relative to engine acceleration and deceleration.

13. The belt accessory drive system of claim 9 wherein engine acceleration fluctuates between a maximum acceleration and a maximum deceleration and the electronic processor commands the accessory to apply the load such that it is varied so that the maximum load is applied substantially 180 degrees out of phase with respect to the maximum acceleration and the minimum load is applied substantially 180 degrees out of phase with respect to maximum deceleration.

14. A method for controlling an accessory driven by an internal combustion engine by a drive pulley of the engine coupled by a belt with a driven pulley coupled to the accessory, comprising:
   varying load applied to the drive belt by the accessory in response to variations in engine acceleration determined from a look up table having a variety of instantaneous engine acceleration and instantaneous fluctuations in engine acceleration from phasing of combustion strokes of the engine such that load applied by the accessory is decreased when engine speed is increasing and load applied by the accessory is increased when engine speed is decreasing.

15. The method of claim 14 wherein the accessory is an alternator.

16. The method of claim 14 wherein the load applied by the accessory is commanded in an anti-phase manner relative to engine acceleration and deceleration.

17. The method of claim 14 wherein acceleration is determined based on one of:
   a signal from a speed sensor coupled to the engine proximate a crankshaft of the engine; and
   a signal from other engine sensors based upon which acceleration is estimated.

* * * * *